United States Patent
Dasgupta et al.

(10) Patent No.: US 12,525,341 B2
(45) Date of Patent: Jan. 13, 2026

(54) TRANSFORMER-BASED NEURAL NETWORK FOR JOINTLY PREDICTING LENGTH OF STAY AND CRITICAL INTERVENTIONS FOR PATIENTS

(71) Applicant: Tata Consultancy Services Limited, Mumbai (IN)

(72) Inventors: Tirthankar Dasgupta, Kolkata (IN); Lipika Dey, Noida (IN); Sudeshna Jana, Kolkata (IN); Abir Naskar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 278 days.

(21) Appl. No.: 18/114,368

(22) Filed: Feb. 27, 2023

(65) Prior Publication Data
US 2023/0274824 A1     Aug. 31, 2023

(30) Foreign Application Priority Data
Feb. 28, 2022 (IN) .............................. 202221010822

(51) Int. Cl.
*G16H 40/20*    (2018.01)
*G06N 3/0442*   (2023.01)
*G16H 10/60*    (2018.01)

(52) U.S. Cl.
CPC ........... *G16H 40/20* (2018.01); *G06N 3/0442* (2023.01); *G16H 10/60* (2018.01)

(58) Field of Classification Search
CPC .......... G06N 3/084; G06N 3/088; G06N 3/09; G06N 3/045; G16H 15/00; G16H 40/67; G16H 50/20; G16H 50/30; G16H 50/70
See application file for complete search history.

(56) References Cited

U.S. PATENT DOCUMENTS

2023/0059693 A1* 2/2023 Liao ..................... G16H 20/00

FOREIGN PATENT DOCUMENTS

EP        3634204          4/2020
WO    WO 2019/022779 A1   1/2019

OTHER PUBLICATIONS

Chrusciel et al., "The prediction of hospital length of stay using unstructured data," BMC Medical Informatics and Decision Making, 21:351 (2021).

(Continued)

*Primary Examiner* — Robert A Sorey
*Assistant Examiner* — Kristine K Rapillo
(74) *Attorney, Agent, or Firm* — FINNEGAN, HENDERSON, FARABOW, GARRETT & DUNNER LLP

(57) ABSTRACT

Currently systems for Length of Stay (LoS) and clinical interventions for patients work independent of each other. However, they are highly interdependent decisions for overall medical predictions for patients. Embodiments disclosed provide a method and system for transformer-based Neural Network (NN) for jointly predicting LoS and critical interventions for patients admitted to medical facilities. A joint NN model, comprising Bidirectional Encoder Representations from Transformers (BERT) model as one of the layers, processes first day clinical notes, available in an unstructured data format, and a plurality of medical attributes of the patient available in a structured data. Further, the joint NN model jointly predicts s (a) the LoS of the patient into one of the classes comprising LONG and SHORT and (b) a Type of Intervention (ToI) for the patient into one among a plurality of classes with each class of the ToI comprising a list of critical clinical interventions.

9 Claims, 6 Drawing Sheets

(56) References Cited

OTHER PUBLICATIONS

Huang et al., "Using nursing notes to improve clinical outcome predicting in intensive care patients: A retrospective cohort study," Journal of the American Medical Informatics Association, 00(0):1-7 (2021).

Mahbub et al., "Unstructured clinical notes within the 24 hours since admission predict short, mid & long-term mortality in adult ICU patients," PLOS ONE (2022).

Suresh et al., "Clinical Intervention Prediction and Understanding using Deep Networks," (2017).

* cited by examiner

Patient be 73 years of age has a history of severe CHD and is admitted to the hospital with a chief complaint of increasing difficulty with angina pectoris that is not controlled with her current medications the patient had a coronary artery bypass procedure in the past two years she has been admitted to the hospital several times with unstable angina angiograms were done five years three years and one month previously coronary angiography one month ago demonstrated complete occlusion of the main stem of the left coronary artery with previous graphs to the left artery anterior descending graft complete occlusion of the circumflex graft complete occlusion of the obtuse marginal branch and partial occlusion of the right coronary artery the total occlusion of the obtuse marginal branch and partial occlusion of the right coronary artery had developed since the previous angiograms. following move following the most recent angiogram patient has experienced a significant hypertensive episode that was successfully treated with dopamine hydrochloride infusion Vidapamil and nitroglycerine ointment

FIG. 3

TRANSFORMER-BASED NEURAL NETWORK FOR JOINTLY PREDICTING LENGTH OF STAY AND CRITICAL INTERVENTIONS FOR PATIENTS

PRIORITY CLAIM

This U.S. patent application claims priority under 35 U.S.C. § 119 to: Indian Patent Application No. 202221010822, filed on Feb. 28, 2022. The entire contents of the aforementioned application are incorporated herein by reference.

TECHNICAL FIELD

The embodiments herein generally relate to automated patient analysis and, more particularly, to a method and system for transformer-based Neural Network (NN) for jointly predicting Length of Stay (LoS) and critical interventions for patients admitted to medical facilities.

BACKGROUND

Managing resources for the admitted patients is one critical aspect in hospital management process. Predicting how long a patient is going to stay in ICU or as an indoor patient, and whether any critical interventions will be required for the patient, are important problems for hospital administration. Intensive Care Units (ICU) in hospitals are specially equipped to continuously monitor and provide continuous care and support to critically ill patients. Given the cost of setting up these facilities, every hospital has only limited number of ICU facilities. Consequently, hospital management needs to do careful planning to ensure that while the resources are well-utilized, non-availability of the facilities do not lead to fatality. Thus, the conventional manual interventions based hospital management is being replaced by intelligent systems.

Predictive planning based on available data has proved to be of great help in this regard. Admission records of past patients containing details about their illness, results of diagnostic tests, treatment, nursing notes along with number of days spent in ICU and other wards (indoor or admitted patients) can help in building these predictive models. Further, analysis of patients' hospital stay data reveals that observations made by nurses about a patient's general health condition, moods and movement, response to medication etc. can provide critical pointers to future status of a patient. Recordings captured during first day of admission, in these nursing notes or clinical notes, has most critical information in prediction of patients medical condition.

Works in literature have provide predictive Machine Learning (ML). models to predict Length of Stay (LoS) for ICU/admitted patients using information such as recorded clinical parameters, patient history and the like. Attempts have also been made on Deep learning based predictions for clinical interventions by analyzing clinical notes. Currently LOS and clinical interventions predictions are performed independent of each other. However, it is understood that LoS and clinical interventions are highly interdependent decisions for overall medical predictions for an admitted patient. In recent times, several works have shown that the use of dependencies between two tasks can significantly improve the performance over independent ML models.

SUMMARY

Embodiments of the present disclosure present technological improvements as solutions to one or more of the above-mentioned technical problems recognized by the inventors in conventional systems.

For example, in one embodiment, a method for predicting Length of Stay (LoS) and Type of Intervention (ToI) for patients is provided. The method includes obtaining medical information associated with a patient among a plurality of patients admitted to a medical facility, the medical information comprising first day clinical notes of the patient, available in an unstructured data format, wherein the first day clinical notes are spread across a plurality of pages; and a plurality of medical attributes of the patient available in a structured data format.

The method further comprises applying a contextual segmentation technique to segment the first day clinical notes spread across the plurality of pages into a plurality of segments in accordance with a plurality of pre-identified target subsections.

The method further comprises processing each of the plurality of segments of the first day clinical notes using Term Frequency-Inverted Document Frequency (TF-IDF) vectorization to generate word level vectorizations, key phrase level vectorization and clinical entity level vectorizations for each of the plurality of segments. The clinical entity level vectorizations providing contextual embedding capturing domain terms are obtained using a clinical domain-specific Bidirectional Encoder Representations from Transformers (BERT) model fed to a Bidirectional Long Short Term Memory (Bi-LSTM) layer.

The method further comprises computing a plurality of Severity of Illness (SOI) scores based on the plurality of medical attributes. The method furthermore comprises receiving, by a joint Neural Network (joint NN) model, input feature vectors in terms of the word level vectorizations, the key phrase level vectorization, the clinical entity level vectorizations and the plurality of SOI scores to (a) predict the LoS of the patient into one of the classes comprising LONG and SHORT and (b) predict the ToI for the patient into one among a plurality of classes when the predicted class for LoS is LONG, with each class of the ToI comprising a list of critical clinical interventions. The joint NN model comprises a fully connected layer connected to the Bi-LSTM layer that jointly perform the LoS and the ToI classification tasks, and wherein the joint NN model is jointly trained by minimizing a cross-entropy loss function which is a joint loss $L_{joint}$ obtained by a linear combination of a LoS loss ($L_1$) and a ToI loss ($L_2$). The joint loss, represented mathematically as: $L_{joint}(\theta)=\lambda*L_1(\theta)+(1-\lambda)*I_{ToI=1}*L_2(\theta)$, where $\lambda$ controls contribution of losses of individual classification tasks in the joint loss, $I_{ToI=1}$ is an indicator function which activates a causal relation labeling loss only when a corresponding ToI classification label is 1 to prevent a LoS classification loss from back propagating when a corresponding ToI classification label is 0. The LoS loss ($L_1$), represented mathematically as: $L_1(\theta)= -\Sigma_{t=1}^{M}\Sigma_{k=1}^{K}\hat{y}\log(y)$, where $\hat{y}$ is a vector representation of a predicted output class of the LoS by the joint NN model for a set of input sentence $x_t$ associated with training first day clinical notes and K represent the number of classes of the LoS. The ToI loss ($L_2$) is represented mathematically as: $L_2(\theta)=-\Sigma_{t=1}^{N}\Sigma_{j=1}^{J}\hat{p}\log(p)$, where $\hat{p}$ is a predicted output class of ToI by the joint NN model, and J represent number of classes of the ToI.

In another aspect, a system for predicting Length of Stay (LoS) and Type of Intervention (ToI) for patients is provided. The system comprises a memory storing instructions; one or more Input/Output (I/O) interfaces; and one or more hardware processors coupled to the memory via the one or more I/O interfaces, wherein the one or more hardware processors are configured by the instructions to obtain medical information associated with a patient among a plurality of patients admitted to a medical facility, the medical information comprising first day clinical notes of the patient, available in an unstructured data format, wherein the first day clinical notes are spread across a plurality of pages; and a plurality of medical attributes of the patient available in a structured data format.

The one or more hardware processors are further configured to apply a contextual segmentation technique to segment the first day clinical notes spread across the plurality of pages into a plurality of segments in accordance with a plurality of pre-identified target subsections.

The one or more hardware processors are further configured to process each of the plurality of segments of the first day clinical notes using Term Frequency-Inverted Document Frequency (TF-IDF) vectorization to generate word level vectorizations, key phrase level vectorization and clinical entity level vectorizations for each of the plurality of segments. The clinical entity level vectorizations providing contextual embedding capturing domain terms are obtained using a clinical domain-specific Bidirectional Encoder Representations from Transformers (BERT) model fed to a Bidirectional Long Short Term Memory (Bi-LSTM) layer.

The one or more hardware processors are further configured to compute a plurality of Severity of Illness (SOI) scores based on the plurality of medical attributes.

The one or more hardware processors are further configured to receive, by a joint Neural Network (joint NN) model, input feature vectors in terms of the word level vectorizations, the key phrase level vectorization, the clinical entity level vectorizations and the plurality of SOI scores to (a) predict the LoS of the patient into one of the classes comprising LONG and SHORT and (b) predict the ToI for the patient into one among a plurality of classes when the predicted class for LoS is LONG, with each class of the ToI comprising a list of critical clinical interventions. The joint NN model comprises a fully connected layer connected to the Bi-LSTM layer that jointly perform the LoS and the ToI classification tasks, and wherein the joint NN model is jointly trained by minimizing a cross-entropy loss function which is a joint loss $L_{joint}$ obtained by a linear combination of a LoS loss ($L_1$) and a ToI loss ($L_2$). The joint loss, represented mathematically as: $L_{joint}(\theta)=\lambda*L_1(\theta)+(1-\lambda)*I_{ToI=1}*L_2(\theta)$, where $\lambda$ controls contribution of losses of individual classification tasks in the joint loss, $I_{ToI=1}$ is an indicator function which activates a causal relation labeling loss only when a corresponding ToI classification label is 1 to prevent a LoS classification loss from back propagating when a corresponding ToI classification label is 0. The LoS loss ($L_1$), represented mathematically as: $L_1(\theta)= -\Sigma_{t=1}^{M}\Sigma_{k=1}^{K}\hat{y}\log(y)$, where $\hat{y}$ is a vector representation of a predicted output class of the LoS by the joint NN model for a set of input sentence $x_t$ associated with training first day clinical notes and K represent the number of classes of the LoS. The ToI loss ($L_2$) is represented mathematically as: $L_2(\theta)=-\Sigma_{y=1}^{N}\Sigma_{j=1}^{J}\hat{p}\log(p)$, where $\hat{p}$ is a predicted output class of ToI by the joint NN model, and J represent number of classes of the ToI.

In yet another aspect, there are provided one or more non-transitory machine-readable information storage mediums comprising one or more instructions, which when executed by one or more hardware processors causes a method for predicting Length of Stay (LoS) and Type of Intervention (ToI) for patients is provided.

The method includes obtaining medical information associated with a patient among a plurality of patients admitted to a medical facility, the medical information comprising first day clinical notes of the patient, available in an unstructured data format, wherein the first day clinical notes are spread across a plurality of pages; and a plurality of medical attributes of the patient available in a structured data format.

The method further comprises applying a contextual segmentation technique to segment the first day clinical notes spread across the plurality of pages into a plurality of segments in accordance with a plurality of pre-identified target subsections.

The method further comprises processing each of the plurality of segments of the first day clinical notes using Term Frequency-Inverted Document Frequency (TF-IDF) vectorization to generate word level vectorizations, key phrase level vectorization and clinical entity level vectorizations for each of the plurality of segments. The clinical entity level vectorizations providing contextual embedding capturing domain terms are obtained using a clinical domain-specific Bidirectional Encoder Representations from Transformers (BERT) model fed to a Bidirectional Long Short Term Memory (Bi-LSTM) layer.

The method further comprises computing a plurality of Severity of Illness (SOI) scores based on the plurality of medical attributes. The method furthermore comprises receiving, by a joint Neural Network (joint NN) model, input feature vectors in terms of the word level vectorizations, the key phrase level vectorization, the clinical entity level vectorizations and the plurality of SOI scores to (a) predict the LoS of the patient into one of the classes comprising LONG and SHORT and (b) predict the ToI for the patient into one among a plurality of classes when the predicted class for LoS is LONG, with each class of the ToI comprising a list of critical clinical interventions. The joint NN model comprises a fully connected layer connected to the Bi-LSTM layer that jointly perform the LoS and the ToI classification tasks, and wherein the joint NN model is jointly trained by minimizing a cross-entropy loss function which is a joint loss $L_{joint}$ obtained by a linear combination of a LoS loss ($L_1$) and a ToI loss ($L_2$). The joint loss, represented mathematically as: $L_{joint}(\theta)=\lambda*L_1(\theta)+(1-\lambda)*I_{ToI=1}*L_2(\theta)$, where $\lambda$ controls contribution of losses of individual classification tasks in the joint loss, $I_{ToI=1}$ is an indicator function which activates a causal relation labeling loss only when a corresponding ToI classification label is 1 to prevent a LoS classification loss from back propagating when a corresponding ToI classification label is 0. The LoS loss ($L_1$), represented mathematically as: $L_1(\theta)= -\Sigma_{t=1}^{M}\Sigma_{k=1}^{K}\hat{y}\log(y)$, where $\hat{y}$ is a vector representation of a predicted output class of the LoS by the joint NN model for a set of input sentence $x_t$ associated with training first day clinical notes and K represent the number of classes of the LoS. The ToI loss ($L_2$) is represented mathematically as: $L_2(\theta)=-\Sigma_{t=1}^{N}\Sigma_{j=1}^{J}\hat{p}\log(p)$, where $\hat{p}$ is a predicted output class of ToI by the joint NN model, and J represent number of classes of the ToI.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a sample first day clinical note illustrating different portions of text, to highlight the different categories of information that the first day clinical note may contain, in accordance with some embodiments of the present disclosure.

Figure 1A:
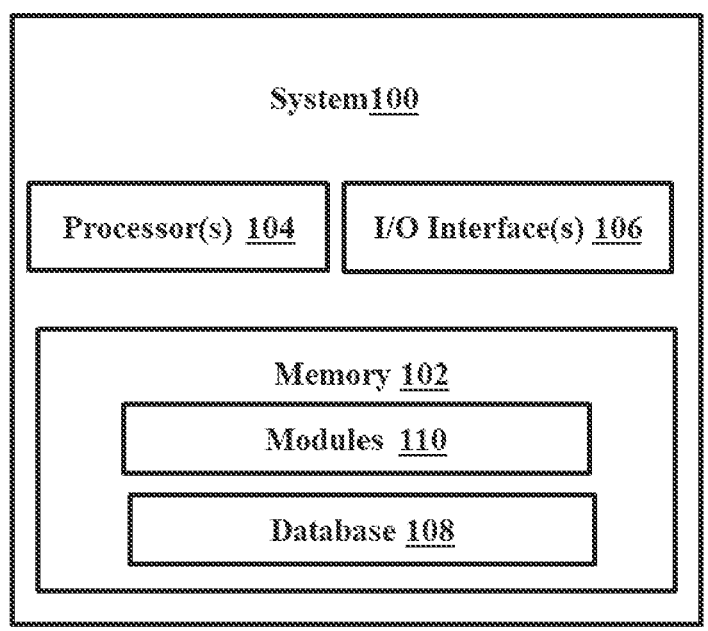
FIG. 1A is a functional block diagram of a system for transformer-based Neural Network (NN) for jointly predicting Length of Stay (LoS) and critical interventions for patients admitted to medical facilities, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method and system for transformer-based Neural Network (NN) for jointly predicting Length of Stay (LoS) and critical interventions for patients admitted to medical facilities. A joint NN model, comprising Bidirectional Encoder Representations from Transformers (BERT) model as one of the layers, processes first day clinical notes, available in an unstructured data format, and a plurality of medical attributes of the patient available in a structured data. Further, the joint NN model jointly predicts s (a) the LoS of the patient into one of the classes comprising LONG and SHORT and (b) a Type of Intervention (ToI) for the patient into one among a plurality of classes with each class of the ToI comprising a list of critical clinical interventions.

The method and system disclosed is configurable and trainable to adapt to different kinds of patients and hospitals. Since different types of patients and hospitals have different facilities, therefore the configurate step is necessary. The method attempts to addressing the poor generalization capability of traditional structured prediction models and also exploit the dependencies between the two tasks, the LoS and the critical clinical interventions, thus effectively improving performance over independent predictions model for LoS and critical clinical interventions. The list of critical clinical interventions is customizable and can be predefined by the system 100 or set by an expert for the type of diseases and capacity and medical procedures available at the medical facility.

Referring now to the drawings, and more particularly to FIGS. 1A through 4, where similar reference characters denote corresponding features consistently throughout the figures, there are shown preferred embodiments and these embodiments are described in the context of the following exemplary system and/or method.

FIG. 1A is a functional block diagram of a system 100 for transformer-based Neural Network (NN) for jointly predicting Length of Stay (LoS) and critical interventions for patients admitted to medical facilities, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with the one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices. The medical information of the patient is received via the I/O interface 106 and similarly output/results of the system 100 can be shared to external devices for further analytics and inferences and notifications to devices of stake holders.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 1B:
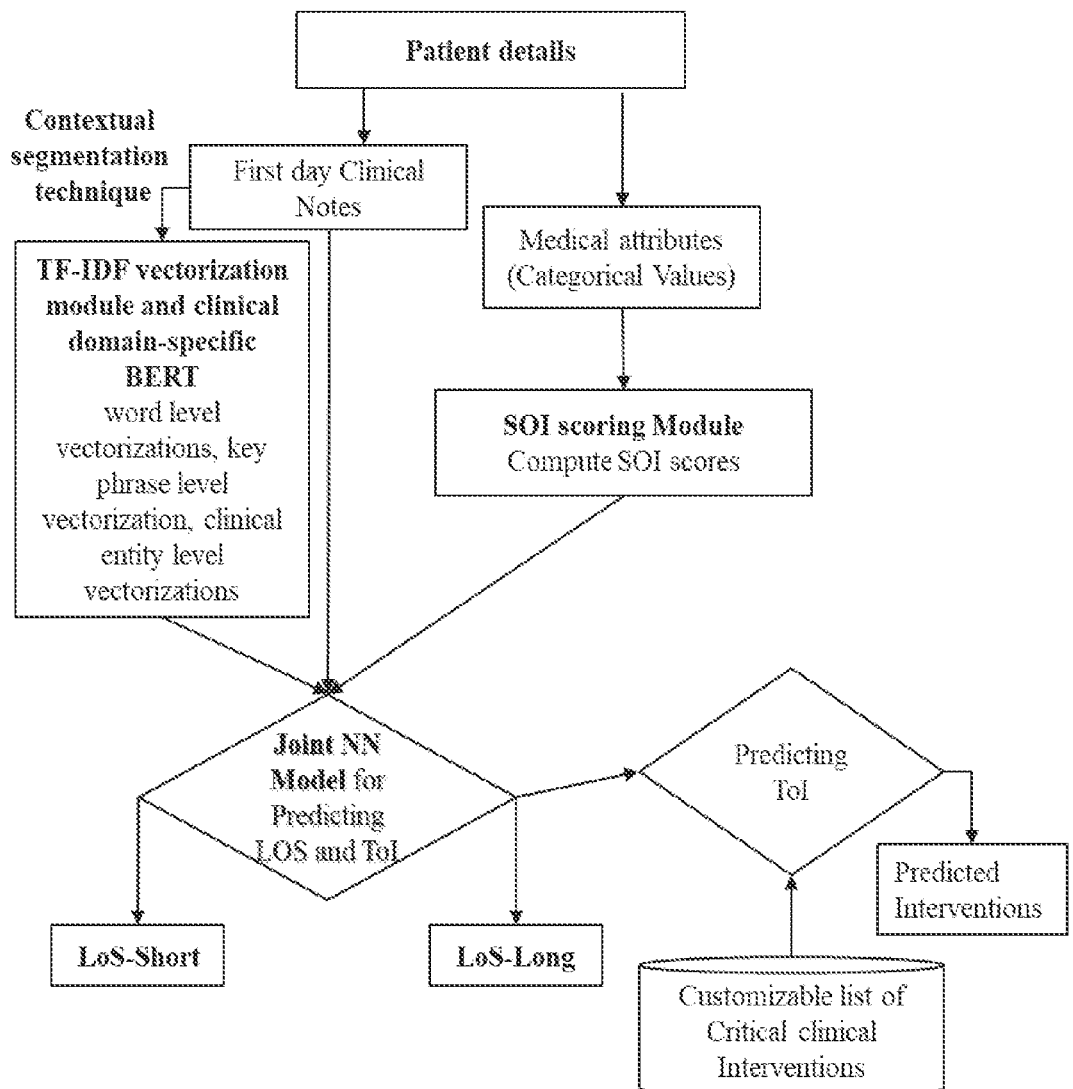
FIG. 1B illustrates a process overview of the system of FIG. 1, in accordance with some embodiments of the present disclosure.

Further, the memory 102 includes a plurality of modules 110 such as a joint NN model, a Term Frequency-Inverted Document Frequency (TF-IDF) vectorization module, a Severity of Illness (SOI) scoring module, a clinical domain-specific BERT, and the like as depicted in FIG. 1B. Further, the memory 102 includes a database 108, which may store plurality of patients admitted to a medical facility, medical information of each of the plurality of patients such as first day clinical notes, a plurality of medical attributes of each patient, the customizable critical clinical interventions under each type of the ToI and the like. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIG. 2 and example of FIG. 3 and joint NN model architecture depicted in FIG. 4.

FIG. 1B illustrates a process overview of the system 100 of FIG. 1A, in accordance with some embodiments of the present disclosure, explained further in conjunction with FIG. 2.

Figure 2A:
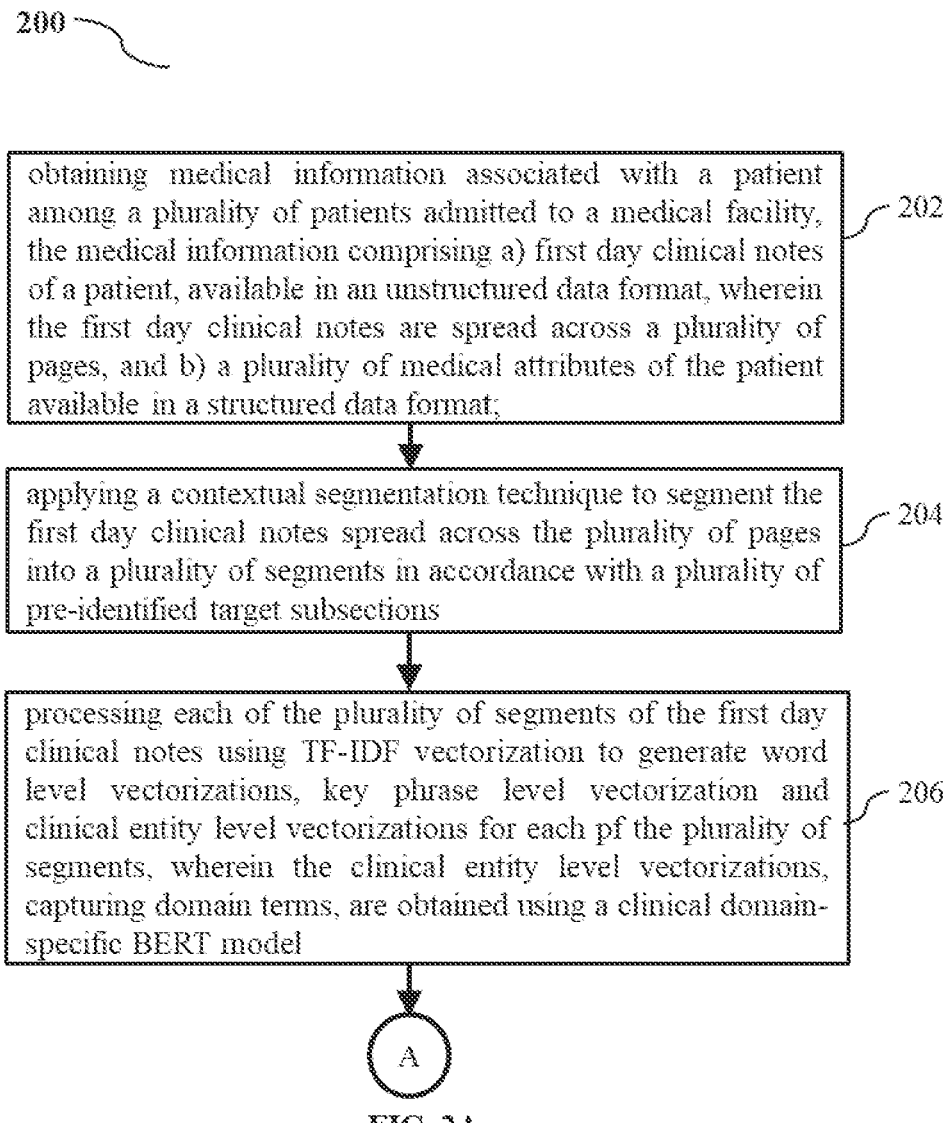
FIGS. 2A and 2B (collectively referred as FIG. 2) is a flow diagram illustrating a method for transformer-based NN for jointly predicting the LoS and critical interventions for patients admitted to medical facilities, using the system of FIG. 1A, in accordance with some embodiments of the present disclosure.
Figure 2B:
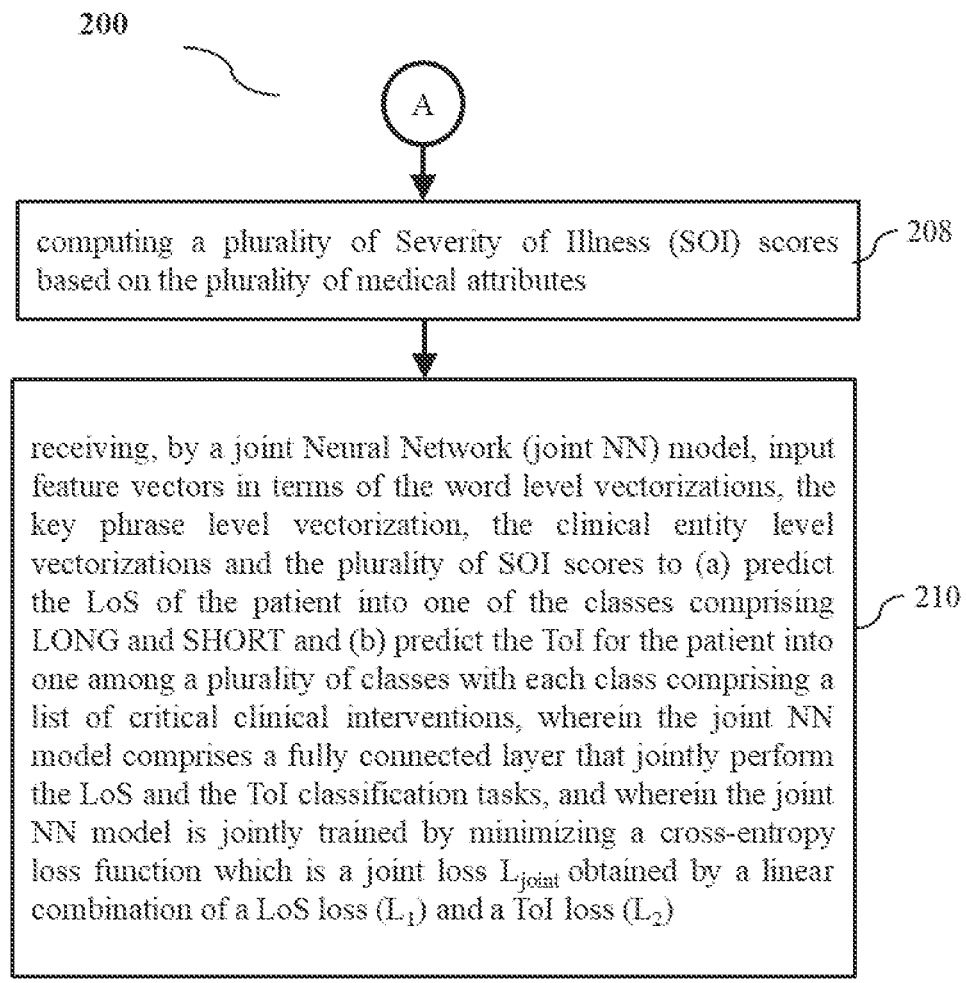

FIGS. 2A and 2B (collectively referred as FIG. 2) is a flow diagram illustrating a method 200 for the transformer-based NN for jointly predicting the LoS and critical interventions for patients admitted to medical facilities, using the system of FIG. 1A, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1A, 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 obtain medical information associated with a patient among a plurality of patients admitted to a medical facility. The medical information as depicted in FIG. 1B comprises the first day clinical notes of the patient, available in an unstructured data format, wherein the first day clinical notes are spread across a plurality of pages. The first day clinical notes, interchangeably referred to as clinical notes or nursing notes, consist of observations made by nurses about a patient's general health condition, moods and movement, response to medication, laboratory test reports etc. Inclusion of all these details make a document long with plurality of pages. During hospitalization, a nursing note contains information about a patient's condition—both physical and psychological as assessed by a nurse, which can provide additional information about a patient beyond physiological parameters measured by instruments or radiology reports etc. Nursing or clinical notes can also provide critical information about a patient's response to treatment based on behavioral descriptions documented by the caregiver. The notes therefore are a rich source of information for predicting the status of a patient, and consequently the need for critical care, if any.

Further, the medical information obtained for the patient also includes the plurality of medical attributes of the patient available in a structured data format. The medical attributes like, patient's demography, Current Procedural Terminology (CPT) events, services, procedures, diagnosis, capillary refill rate, diastolic blood pressure, fraction inspired oxygen, glasgow coma scale, glucose, heart rate, Blood Pressure (BP), gender, age, hour of admission, height, weight, ethnicity, unit admit source, unit visit number, unit stay, num beds, physician specialty, different laboratory test results, and pre-existing medical conditions etc. are structured in nature.

Once medical information is obtained, information extraction from the first day clinical notes is performed using Natural Language processing so that the extracted information can be suitably represented so to be consumed by the joint NN model for predictions. The first day clinical notes, interchangeably referred to as clinical notes, consist of observations made by nurses about a patient's general health condition, moods and movement, response to medication, laboratory test reports etc. Inclusion of all these details make a document long enough to process by standard transformer based encoding models that typically work on 512 word-piece tokens. There exist specific transformer models to handle long documents. Such models typically segment the document in a fixed overlapping window of 512 word piece tokens, process them individually and then combine the encoded representations together. However, segmenting a document into a fixed length of 512 token may result in loss of information. In order to overcome this, a contextual segmentation technique to handle long documents is disclosed. Thus, at step 204 of the method 200, the one or more hardware processors 104 apply the contextual segmentation technique to segment the first day clinical notes spread across the plurality of pages into a plurality of segments in accordance with a plurality of pre-identified target subsections. The plurality of pre-identified target subsections are obtained by identifying a plurality of subsections present within the plurality of pages of a plurality of clinical notes from historical data of the medical facility. Each of the plurality of subsections comprises assessment, action, response, plan, social, psychosocial, and allergies and the like. Further, the most frequent subsections are computed from among the plurality of subsection and are identified as the plurality of target subsections. Therefore, if there are 'n' numbers of target subsections in a given document 'D', then 'D' has 'n' different segments.

At step 206 of the method 200, the TF-IDF vectorization module executed by the one or more hardware processors 104 processes each of the plurality of segments of the first day clinical notes using Term Frequency-Inverted Document Frequency (TF-IDF) vectorization to generate a plurality of word level vectorizations (word level vectorizations), a plurality of key phrase level vectorization (key phrase level vectorization) and a plurality of clinical entity level vectorizations (clinical entity level vectorizations) for each of the plurality of segments. The clinical entity level vectorizations, capturing domain terms, are obtained using a clinical domain-specific Bidirectional Encoder Representations from Transformers (BERT) model.

Computing word level vectorizations, key phrase level vectorization and clinical entity level vectorizations (also referred to as domain term vectors): Use of linguistic expressions and domain terms like "extensive cardiac hx", "slightly tachypneic", and "severe scrotal infection" provide an added dimension of human assessment, that cannot be captured through numbers only, but can be important while distinguishing between two similar patients affected by same disease, who are possibly responding differently to the treatment. Accordingly, to compute domain term vectors that can be used to capture domain specific information effectively, the method utilizes Term Frequency-Inverted Document Frequency (TF-IDF) feature vector. Incorporating such domain terms can substantially improve the performance of prediction. This is due to the inherent capability of the vectors to simultaneously capture the common and distinct domain specific features effectively. The process of computing domain term vectors comprising the word level vectorization and key phrase level vectorization is as follows:

1. Identify all the words within the text
2. Identify all the key-phrases present in the text using a toll such as RAKE tool.
3. Extract several clinical entities from the text using an entity extraction model executed by the one or more hardware processors 104.
4. For each word, bigrams, key phrase, and clinical entities, compute the TF-IDF vector. For each term, compute term frequency (TF) by the number of times term occurred in a text.
5. TF(t)=No. of times term 't' occurs in a text and for measure of how common or rare a term is across the entire corpus of documents we compute IDF by
6. IDF(t)=log(N/df(t)), where N is the total number of texts and df(t) is the number of texts in which term t occurred.
7. Then, TF-IDF value of a term in a text is the product of its TF and IDF.

The higher valued term is the more relevant in that document.

Figure 4:
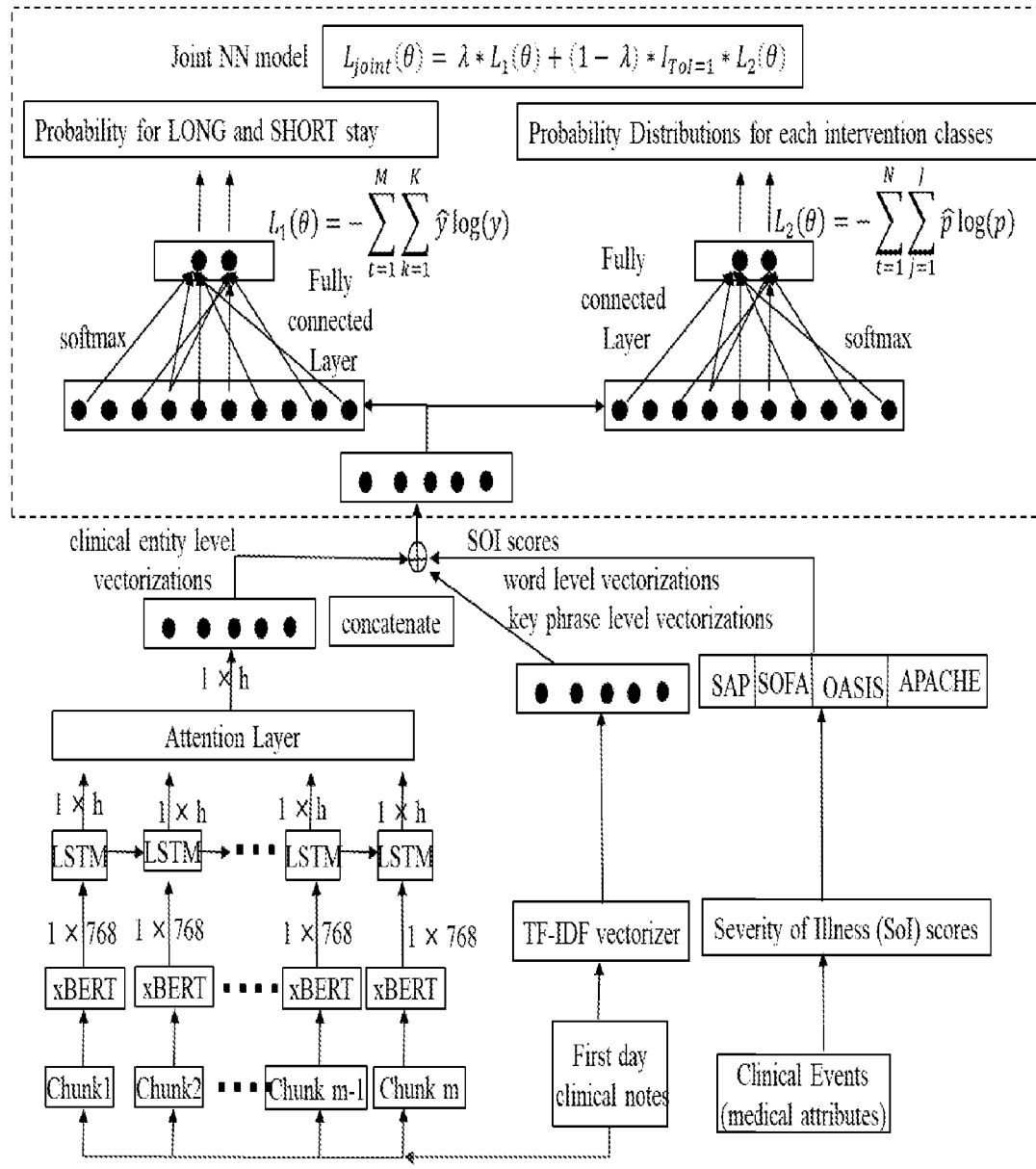
FIG. 4 depicts NN architecture of the system of FIG. 1A comprising a joint NN model built to jointly predict the LoS and critical interventions for patients al in accordance with some embodiments of the present disclosure.

Process for extracting of clinical entities: Unlike the conventional TF-IDF technique that focusses on words and key phrases during vectorization, the method 200 also generates vectors for the clinical entities that are also fed to the joint NN model for joint classification for LoS and ToI. The clinical entities are identified to generate clinical entity level vectorization using the clinical domain-specific BERT model as depicted in FIG. 4. Practically, clinical entities of interest that are to be extracted is large, for example around for a specific scenario. The clinical entities such as, diseases, treatment, lab-tests, patient's demography, health condition, lifestyle, different kind of interventions like surgical, physical, pharmacological, psychological, and different kind of outcomes like, physical, pain, mortality, adverse-effect, and mental are to be extracted. FIG. 3 shows a sample nursing note or the first day clinical note with different portions of text bounded with different types of patterned boxes and underline patterns, to highlight the different categories of information that a note may contain. For extracting such clinical entities, the system builds a transformer-based model as shown in architecture diagram of the system 100 in FIG. 4.

For learning the representation of the clinical entities, the clinical domain-specific BERT model, for example Clinical BioBERT model, is used, which is pretrained over a corpus of biomedical research articles sourced from PubMed article abstracts on top of a BERT model is used. As depicted in system NN architecture of FIG. 4, these pretrained models have 12 layers of transformer blocks, 768 hidden units, and 12 self-attention heads. The input of this model is represented as token embedding, a learned segment embedding for identifying the sequence of the token, and position embedding corresponding to the token's position in the input sequence. A classification token [CLS] is inserted in front and a [SEP] token at the end of each sentence of the note. A Xavier initialization is used to ensure that the BERT fine-tuning process converges. Further, we set the early stopping of fine-tuning to 800 steps in order to prevent over-fitting. A batch size 12 is used, and a maximum sequence length of 128 for fine-tuning this model. The output of each token from the last hidden layer is fed into a Bidirectional Long Short Term Memory (Bi-LSTM), which consists of a forward LSTM and a backward LSTM and concatenate the output for each token. For obtaining the dependency relation between the tags a CRF layer is used at the top of BiLSTM layer. Then the output vector of each token passes through a fully connected layer with sigmoid activation function.

Fine-tuning the BERT Model: As depicted in system NN architecture of FIG. 4, the BERT uses a multi-layer bidirectional Transformer encoder architecture based on the transformer model proposed in the literature. It uses 12 layers of transformer blocks, 768 hidden units, and 12 self-attention heads. The model is pre-trained with two strategies on large-scale unlabeled text—masked language model and next sentence prediction. The input representation is a concatenation of Word-Piece embeddings, positional embeddings, and the segment embedding. A pre-trained BlueBERT model provides a powerful context-dependent sentence representation and can be used for various target tasks through the fine-tuning procedure. Bio-BERT is another base model, that is specifically trained on Biomedical literature. This can also be fine-tuned with task-specific data, if required. Fine-tuning the pre-trained model with training data from different domains is known to improve the performance of language processing tasks. A Xavier initialization to ensure that the BERT fine-tuning process converges. Further, the early stopping of fine-tuning is set to 800 steps in order to prevent over-fitting. A batch size 32, a maximum sequence length of 128, and a learning rate of 2×10-5 for fine-tuning this model.

Similar to information extraction from clinical notes, information from the medical attributes is captured in terms of the plurality of Severity of Illness (SOI) scores ready to be consumed by the joint NN model. There are a number of scoring systems of intensive care unit (ICU) patients for estimating the severity of the disease. These severity scores are computed as functions of patient's medical attributes. The plurality of SOI scores utilized by the method 200 comprise (a) a Sepsis Related Organ Failure Assessment (SOFA) score, (b) physiological assessment related scoring indicated by an Acute Physiology and Chronic Health Evaluation (APACHE), (c) a Simplified Acute Physiology Score (SAPS), (d) an Oxford Acute Severity of Illness Score (OASIS) and the like. The SOI scores are computed by tools well known in the literature. Thus, as depicted in FIGS. 1B and 4, at step 208 of the method 200, the SOI module executed by the one or more hardware processors 104 computes the SOI scores from medical attributes collected during the first day (first 24 hours of patient admission).

At step 210 of the method 200, the joint Neural Network (joint NN) model executed by the one or more processors 104, receives input feature vectors in terms of the word level vectorizations, the key phrase level vectorization, the clinical entity level vectorizations, and the plurality of SOI scores to:
(a) Predict the LoS of the patient into one of the classes comprising LONG and SHORT. Here a stay shorter than the median value of a dataset is termed as short, otherwise long. For this dataset, the median value was found to be 4.

(b) Predict the ToI for the patient into one among a plurality of classes when the predicted class for LoS is LONG. Each class of the ToI comprises a list of critical clinical interventions. Example interventions include, cardiac bypass surgery, stent surgery, ventilation, angioplasty, and angiogram and the like.

As depicted in system NN architecture of FIG. 4, the clinical domain-specific BERT model generates contextual embedding for the input feature vectors. The contextual embeddings are fed, via the Bi-LSTM layer, to the joint NN model comprising a fully connected layer that jointly performs the LoS and the ToI classification tasks.

The joint NN model also receives the word level vectorizations and the plurality of key phrase level vectorizations generated from the TF-IDF vectorization module, and the SOI scores computed by the SOI scoring module.

Training of joint NN model: The joint NN model is jointly trained by minimizing a cross-entropy loss function which is a joint loss $L_{joint}$ obtained by a linear combination of a LoS loss ($L_1$) and a ToI loss ($L_2$). Given a set of training features $x_t$, the joint NN model tries to predict whether the LoS $\in$ the class {LONG, SHORT} and ToI $\in$ {list of critical clinical interventions}. The training of the joint NN model is based on the joint loss, represented mathematically as:

$$L_{joint}(\theta) = \lambda * L_1(\theta) + (1-\lambda) * I_{ToI=1} * L_2(\theta) \quad (1)$$

where $\lambda$ controls contribution of losses of individual classification tasks in the joint loss, $I_{ToI=1}$ is an indicator function which activates a causal relation labeling loss only when a corresponding ToI classification label is 1 to prevent a LoS classification loss from back propagating when a corresponding ToI classification label is 0.

The LoS loss ($L_1$), represented mathematically as:

$$L_1(\theta) = -\Sigma_{t=1}^{M} \Sigma_{k=1}^{K} \hat{y} \log(y) \quad (2)$$

where $\hat{y}$ is a vector representation of a predicted output class of the LoS by the joint NN model for a set of input sentence $x_t$ associated with training first day clinical notes and K represent the number of classes of the LoS. The ToI loss ($L_2$) is represented mathematically as:

$$L_2(\theta) = -\Sigma_{t=1}^{N} \Sigma_{j=1}^{J} \hat{p} \log(p) \quad (3)$$

where $\hat{p}$ is a predicted output class of ToI by the joint NN model, and J represent number of classes of the ToI. The vector representation of the output class of the ToI pertain to medical interventions like, bypass surgery, stent surgery, ventilation, angioplasty, and angiogram.

Thus, the method and system disclosed herein combine the TF-IDF vector along with the BERT language model and captures information about the importance of words across first day clinical notes. Using an attention layer in the system NN architecture allows the predictive model to learn weights for important phrases for each class. These are additionally output as explanations for a decision. The method attempts to address poor generalization capability of traditional structured prediction models and also exploit the dependencies between the two tasks, the LoS and the critical clinical interventions, thus effectively improving performance over independent predictions model for LoS and critical clinical interventions. The list of critical clinical interventions is customizable and can be predefined by the system or set by an expert for the type of diseases and capacity and medical procedures available at the medical facility.

During hospitalization surgical interventions such as bypass surgery, biopsy, cholecystectomy, are crucial to prevent life-threatening illness or injury, so hospital management needs to do careful planning of the resources. Also, most of the surgical interventions are cost sensitive, therefore, accurate predictive planning as disclosed by the method and system proves to be accurate and time efficient for hospital management systems with great utility for patient families.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for predicting Length of Stay (LoS) and Type of Intervention (ToI) for patients, the method comprising:
   obtaining, via one or more hardware processors, medical information associated with a patient among a plurality of patients admitted to a medical facility, the medical information comprising:
     a) first day clinical notes of the patient, available in an unstructured data format, wherein the first day clinical notes are spread across a plurality of pages, wherein the first day clinical note include varied portions of text bounded with varied types of patterned boxes and underline patterns, to highlight the varied categories of information in the clinical note and to extract clinical entities, a transformer-based model is built; and
     b) a plurality of medical attributes of the patient available in a structured data format;
   applying, via the one or more hardware processors, a contextual segmentation technique to segment the first day clinical notes spread across the plurality of pages into a plurality of segments in accordance with a plurality of pre-identified target subsections, wherein the plurality of pre-identified target subsections are obtained by:
   identifying a plurality of subsections present within the plurality of pages of a plurality of clinical notes from historical data of the medical facility, wherein each of the plurality of subsections comprising assessment, action, response, plan, social, psychosocial, and allergies;
   computing most frequent subsections from among the plurality of subsection, wherein the most frequent subsections are identified as the plurality of target subsections, wherein when there are 'n' numbers of target subsections in a document 'D', then 'D' includes 'n' distinct segments;
   processing, via the one or more hardware processors, each of the plurality of segments of the first day clinical notes using Term Frequency-Inverted Document Frequency (TF-IDF) vectorization to generate a plurality of word level vectorizations, a plurality of key phrase level vectorizations, and a plurality of clinical entity level vectorizations for each of the plurality of segments, wherein the clinical entity level vectorizations providing contextual embedding capturing domain terms, are obtained using a clinical domain-specific Bidirectional Encoder Representations from Transformers (BERT) model fed to a Bidirectional Long Short Term Memory (Bi-LSTM) layer;
   training a Clinical BioBERT model over a corpus of biomedical research articles sourced from abstracts, wherein an input to the Clinical BioBERT model is represented as a token embedding, a learned segment embedding for identifying sequence of a token, and a position embedding corresponding to token's position in an input sequence;
   obtaining a dependency relation between the each of the tokens by using a CRF layer at top of BiLSTM layer and passing an output vector of each token through a fully connected layer with sigmoid activation function;
   training a BlueBERT model with bio-medical literature providing a context-dependent sentence representation;
   fine-tuning the Clinical BioBERT model and the BlueBERT model with a Xavier initialization ensuring convergence, followed by setting early stopping of the fine-tuning to predefined steps to prevent over-fitting;
   computing, via the one or more hardware processors, a plurality of Severity of Illness (SOI) scores based on the plurality of medical attributes; and
   receiving, by a joint Neural Network (joint NN) model executed by the one or more hardware processors, input feature vectors in terms of the word level vectorizations, the key phrase level vectorization, the clinical entity level vectorizations and the plurality of SOI scores to (a) predict the LoS of the patient into one of the classes comprising LONG and SHORT, and (b) predict the ToI for the patient into one among a plurality of classes when the predicted class for LoS is LONG, with each class of the ToI comprising a list of critical clinical interventions, wherein the joint NN model comprises a fully connected layer connected to the Bi-LSTM layer that jointly perform the LOS and the ToI classification tasks, and wherein the joint NN model is jointly trained by minimizing a cross-entropy loss function which is a joint loss $L_{joint}$ obtained by a linear combination of a LoS loss ($L_1$) and a ToI loss ($L_2$) and wherein the list of critical clinical interventions is customizable for plurality of type of diseases, capacity and medical procedures available at the medical facility;
   generating contextual embedding for the input feature vectors, wherein the contextual embeddings are fed, via the Bi-LSTM layer, to the joint NN model comprising a fully connected layer that jointly perform the LOS and the ToI classification tasks.

2. The method of claim 1, wherein training of the joint NN model is based on:
   a) the joint loss, represented mathematically as:
      $L_{joint}(\theta) = \lambda * L_1(\theta) + (1-\lambda) * I_{ToI=1} * L_2(\theta)$, where $\lambda$ controls contribution of losses of individual classification tasks in the joint loss, $I_{ToI=1}$ is an indicator function which activates a causal relation labeling loss only when a corresponding ToI classification label is 1 to prevent a LOS classification loss from back propagating when a corresponding ToI classification label is 0;
   b) the LoS loss ($L_1$), represented mathematically as:
      $L_1(\theta) = -\Sigma_{t=1}^{M} \Sigma_{k=1}^{K} \hat{y} \log(y)$, where $\hat{y}$ is a vector representation of a predicted output class of the LOS by the joint NN model for a set of input sentence $x_t$ associated with training first day clinical notes and K represent the number of classes of the LoS; and c) the ToI loss ($L_2$) is represented mathematically as: $L_2(\theta) = -\Sigma_{t=1}{}^N \Sigma_{j=1}{}^J$ {circumflex over (p)} log (p), where {circumflex over (p)} is a predicted output class of ToI by the joint NN model, and J represent number of classes of the ToI.

3. The method of claim 1, wherein the plurality of SOI scores comprise (a) a Sepsis Related Organ Failure Assessment (SOFA) score, (b) physiological assessment related scoring indicated by an Acute Physiology and Chronic Health Evaluation (APACHE), (c) a Simplified Acute Physiology Score (SAPS), and (d) an Oxford Acute Severity of Illness Score (OASIS).

4. A system for predicting Length of Stay (LoS) and Type of Intervention (ToI) for patients, the system comprising:
a memory storing instructions;
one or more Input/Output (I/O) interfaces; and
one or more hardware processors coupled to the memory via the one or more I/O interfaces, wherein the one or more hardware processors are configured by the instructions to:
obtain medical information associated with a patient among a plurality of patients admitted to a medical facility, the medical information comprising:
a) first day clinical notes of the patient, available in an unstructured data format, wherein the first day clinical notes are spread across a plurality of pages, wherein the first day clinical note include varied portions of text bounded with varied types of patterned boxes and underline patterns, to highlight the varied categories of information in the clinical note and to extract clinical entities, a transformer-based model is built; and
b) a plurality of medical attributes of the patient available in a structured data format;
apply a contextual segmentation technique to segment the first day clinical notes spread across the plurality of pages into a plurality of segments in accordance with a plurality of pre-identified target subsections;
identifying a plurality of subsections present within the plurality of pages of a plurality of clinical notes from historical data of the medical facility, wherein each of the plurality of subsections comprising assessment, action, response, plan, social, psychosocial, and allergies;
computing most frequent subsections from among the plurality of subsection, wherein the most frequent subsections are identified as the plurality of target subsections, wherein when there are 'n' numbers of target subsections in a document 'D', then 'D' includes 'n' distinct segments;
process each of the plurality of segments of the first day clinical notes using Term Frequency-Inverted Document Frequency (TF-IDF) vectorization to generate a plurality of word level vectorizations, a plurality of key phrase level vectorization and a plurality of clinical entity level vectorizations for each of the plurality of segments, wherein the clinical entity level vectorizations providing contextual embedding capturing domain terms are obtained using a clinical domain-specific Bidirectional Encoder Representations from Transformers (BERT) model fed to a Bidirectional Long Short Term Memory (Bi-LSTM) layer;
train a Clinical BioBERT model over a corpus of biomedical research articles sourced from abstracts, wherein input to the Clinical BioBERT model is represented as a token embedding, a learned segment embedding for identifying sequence of a token, and a position embedding corresponding to token's position in an input sequence;
obtaining a dependency relation between the each of the tokens by using a CRF layer at top of BiLSTM layer and passing an output vector of each token through a fully connected layer with sigmoid activation function;
train a BlueBERT model with bio-medical literature providing a powerful context-dependent sentence representation;
fine-tune the Clinical BioBERT model and the BlueBERT model with a Xavier initialization ensuring convergence, followed by setting early stopping of the fine-tuning to predefined steps to prevent over-fitting;
compute a plurality of Severity of Illness (SOI) scores based on the plurality of medical attributes; and
receive, by a joint Neural Network (joint NN) model executed by the one or more hardware processors, input feature vectors in terms of the word level vectorizations, the key phrase level vectorization, the clinical entity level vectorizations and the plurality of SOI scores to (a) predict the LoS of the patient into one of the classes comprising LONG and SHORT and (b) predict the ToI for the patient into one among a plurality of classes when the predicted class for LoS is LONG, with each class of the ToI comprising a list of critical clinical interventions, wherein the joint NN model comprises a fully connected layer connected to the Bi-LSTM layer that jointly perform the LOS and the ToI classification tasks, and wherein the joint NN model is jointly trained by minimizing a cross-entropy loss function which is a joint loss $L_{joint}$ obtained by a linear combination of a LoS loss ($L_1$) and a ToI loss ($L_2$) and wherein the list of critical clinical interventions is customizable and is predefined by an expert for plurality of type of diseases, capacity and medical procedures available at the medical facility;
generating contextual embedding for the input feature vectors, wherein the contextual embeddings are fed, via the Bi-LSTM layer, to the joint NN model comprising a fully connected layer that jointly perform the LOS and the ToI classification tasks.

5. The system of claim 4, wherein the one or more hardware processors are configured to train of the joint NN model is based on:
a) the joint loss, represented mathematically as: $L_{joint}(\theta) = \lambda * L_1(\theta) + (1-\lambda) * I_{ToI=1} * L_2(\theta)$, where $\lambda$ controls contribution of losses of individual classification tasks in the joint loss, $I_{ToI=1}$ is an indicator function which activates a causal relation labeling loss only when a corresponding ToI classification label is 1 to prevent a LOS classification loss from back propagating when a corresponding ToI classification label is 0;
b) the LoS loss ($L_1$), represented mathematically as: $L_1(\theta) = -\Sigma_{t=1}{}^M \Sigma_{k=1}{}^K \hat{y} \log (y)$, where $\hat{y}$ is a vector representation of a predicted output class of the LOS by the joint NN model for a set of input sentence $x_t$ associated with training first day clinical notes and K represent the number of classes of the LoS; and
c) the ToI loss ($L_2$) is represented mathematically as: $L_2(\theta) = -\Sigma_{t=1}{}^N \Sigma_{j=1}{}^J$ {circumflex over (p)} log (p), where {circumflex over (p)} is a predicted output class of ToI by the joint NN model, and J represent number of classes of the ToI.

6. The system of claim 4, wherein the plurality of SOI scores comprise (a) a Sepsis Related Organ Failure Assessment (SOFA) score (b) physiological assessment related scoring indicated by an Acute Physiology and Chronic Health Evaluation (APACHE), (c) a Simplified Acute Physiology Score (SAPS) and (d) an Oxford Acute Severity of Illness Score (OASIS).

7. One or more non-transitory machine-readable information storage mediums comprising one or more instructions which when executed by one or more hardware processors cause a method for predicting Length of Stay (LoS) and Type of Intervention (ToI) for patients, the method comprising:
   obtaining medical information associated with a patient among a plurality of patients admitted to a medical facility, the medical information comprising:
   a) first day clinical notes of the patient, available in an unstructured data format, wherein the first day clinical notes are spread across a plurality of pages, wherein the first day clinical note include varied portions of text bounded with varied types of patterned boxes and underline patterns, to highlight the varied categories of information in the clinical note and to extract clinical entities, a transformer-based model is built; and
   b) a plurality of medical attributes of the patient available in a structured data format;
   applying a contextual segmentation technique to segment the first day clinical notes spread across the plurality of pages into a plurality of segments in accordance with a plurality of pre-identified target subsections;
   identifying a plurality of subsections present within the plurality of pages of a plurality of clinical notes from historical data of the medical facility, wherein each of the plurality of subsections comprising assessment, action, response, plan, social, psychosocial, and allergies;
   computing most frequent subsections from among the plurality of subsection, wherein the most frequent subsections are identified as the plurality of target subsections, wherein when there are 'n' numbers of target subsections in a document 'D', then 'D' includes 'n' distinct segments;
   processing each of the plurality of segments of the first day clinical notes using Term Frequency-Inverted Document Frequency (TF-IDF) vectorization to generate a plurality of word level vectorizations, a plurality of key phrase level vectorizations, and a plurality of clinical entity level vectorizations for each of the plurality of segments, wherein the clinical entity level vectorizations providing contextual embedding capturing domain terms, are obtained using a clinical domain-specific Bidirectional Encoder Representations from Transformers (BERT) model fed to a Bidirectional Long Short Term Memory (Bi-LSTM) layer;
   training a Clinical BioBERT model over a corpus of biomedical research articles sourced from abstracts, wherein input to the Clinical BioBERT model is represented as a token embedding, a learned segment embedding for identifying sequence of a token, and a position embedding corresponding to token's position in an input sequence;
   obtaining a dependency relation between the each of the tokens by using a CRF layer at top of BiLSTM layer and passing an output vector of each token through a fully connected layer with sigmoid activation function;
   training a BlueBERT model with bio-medical literature providing a powerful context-dependent sentence representation;
   fine-tuning the Clinical BioBERT model and the BlueBERT model with a Xavier initialization ensuring convergence, followed by setting early stopping of the fine-tuning to predefined steps to prevent over-fitting;
   computing a plurality of Severity of Illness (SOI) scores based on the plurality of medical attributes; and
   receiving, by a joint Neural Network (joint NN) model executed by the one or more hardware processors, input feature vectors in terms of the word level vectorizations, the key phrase level vectorization, the clinical entity level vectorizations and the plurality of SOI scores to (a) predict the LoS of the patient into one of the classes comprising LONG and SHORT, and (b) predict the ToI for the patient into one among a plurality of classes when the predicted class for LoS is LONG, with each class of the ToI comprising a list of critical clinical interventions, wherein the joint NN model comprises a fully connected layer connected to the Bi-LSTM layer that jointly perform the LOS and the ToI classification tasks, and wherein the joint NN model is jointly trained by minimizing a cross-entropy loss function which is a joint loss $L_{joint}$ obtained by a linear combination of a LoS loss ($L_1$) and a ToI loss ($L_2$) and wherein the list of critical clinical interventions is customizable and is predefined by an expert for plurality of type of diseases, capacity and medical procedures available at the medical facility;
   generating contextual embedding for the input feature vectors, wherein the contextual embeddings are fed, via the Bi-LSTM layer, to the joint NN model comprising a fully connected layer that jointly perform the LOS and the ToI classification tasks.

8. The one or more non-transitory machine-readable information storage mediums of claim 7, wherein training of the joint NN model is based on:
   a) the joint loss, represented mathematically as: $L_{joint}(\theta) = \lambda * L_1(\theta) + (1-\lambda) * I_{ToI=1} * L_2(\theta)$, where $\lambda$ controls contribution of losses of individual classification tasks in the joint loss, $I_{ToI=1}$ is an indicator function which activates a causal relation labeling loss only when a corresponding ToI classification label is 1 to prevent a LOS classification loss from back propagating when a corresponding ToI classification label is 0;
   b) the LoS loss ($L_1$), represented mathematically as: $L_1(\theta) = -\Sigma_{t=1}^{M} \Sigma_{k=1}^{K} \hat{y} \log(y)$, where $\hat{y}$ is a vector representation of a predicted output class of the LOS by the joint NN model for a set of input sentence $x_t$ associated with training first day clinical notes and K represent the number of classes of the LoS; and
   c) the ToI loss ($L_2$) is represented mathematically as: $L_2(\theta) = -\Sigma_{t=1}^{N} \Sigma_{j=1}^{J} \{\text{circumflex over (p)}\} \log(p)$, where {circumflex over (p)} is a predicted output class of ToI by the joint NN model, and J represent number of classes of the ToI.

9. The one or more non-transitory machine-readable information storage mediums of claim 7, wherein the plurality of SOI scores comprise (a) a Sepsis Related Organ Failure Assessment (SOFA) score, (b) physiological assessment related scoring indicated by an Acute Physiology and Chronic Health Evaluation (APACHE), (c) a Simplified Acute Physiology Score (SAPS), and (d) an Oxford Acute Severity of Illness Score (OASIS).

* * * * *